Aug. 12, 1924.  
J. W. CARRINGTON  
CLEANING DEVICE FOR AUTOMOBILES  
Filed Oct. 10, 1921  
1,504,868  
2 Sheets-Sheet 2

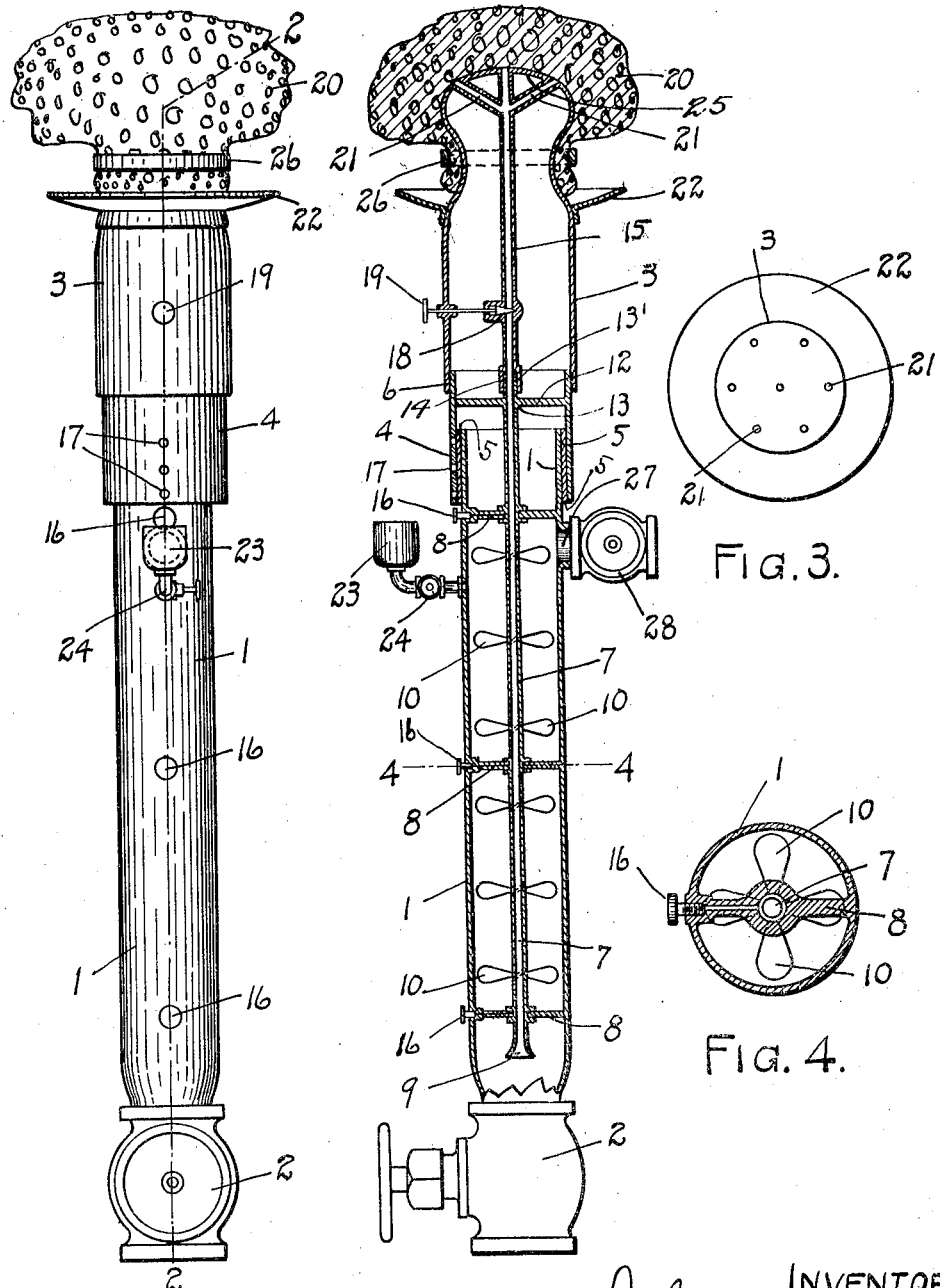

INVENTOR.
John W. Carrington
ATTORNEY.

Patented Aug. 12, 1924.

1,504,868

UNITED STATES PATENT OFFICE.

JOHN W. CARRINGTON, OF CINCINNATI, OHIO.

CLEANING DEVICE FOR AUTOMOBILES.

Application filed October 10, 1921. Serial No. 506,724.

*To all whom it may concern:*

Be it known that I, JOHN W. CARRINGTON, a citizen of the United States, residing at the city of Cincinnati, in the county of Hamilton and State of Ohio, have invented certain new and useful Improvements in Cleaning Devices for Automobiles, of which the following is a specification.

The object of my invention is to provide a very efficient device for cleaning automobiles and other vehicles, especially motor driven vehicles.

It consists essentially of a nozzle preferably of cylindrical form, containing therein a contracted pipe carrying paddle wheels or wings, which inner pipe is driven by the force of a stream of water passing through said cylindrical nozzle, and means for applying heads at the end of the nozzle, capable of revolving; these revolving heads being of various configuration and construction for doing different classes of cleaning; each of said heads carrying a cleaning element, capable of being attached thereto or removed therefrom. With these removable heads different classes of cleaning work can be done, such as, for example, washing, rinsing, rubbing, drying, polishing, or any work needed for proper satisfactory cleaning of an automobile.

Its various features and advantages will readily become apparent from the following specification and claims.

In the accompanying drawings forming a part of this specification:

Fig. 1, is an elevation of the device,

Fig. 2, is a section taken on line 2—2 of Fig. 1,

Fig. 3, is a top view of the outlet nozzle with sponge removed,

Fig. 4, is a section on line 4—4 of Fig. 2,

Figure 5:
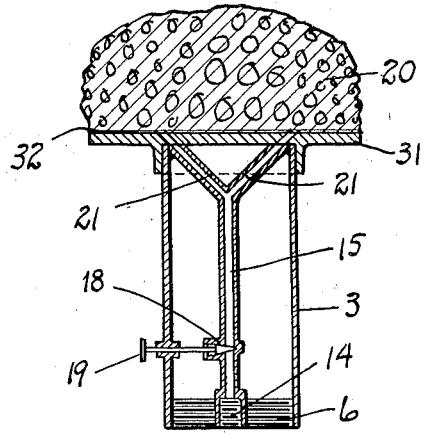
Fig. 5, is a section on line 5—5 of Fig. 6.
Figure 6:
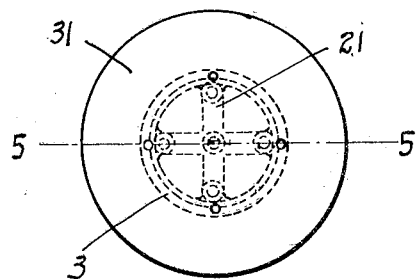
Fig. 6, is a top view of part shown in Fig. 5.

In the drawings, 1 represents a cylinder forming a nozzle element; at the bottom whereof is a valve 2, which can be attached to any water supply source, as a hose, hydrant, faucet or the like. At the top of the cylinder 1, I attach a head 3, which is removable therefrom and will be more fully described hereafter. At the top part of the cylinder 1, I attach a sleeve 4, interposing between the sleeve and the cylinder 1, a hard rubber packing 5, which may be made of any other material. The head 3 is attached to upper part of the sleeve 4, by being screwed thereto at point 6, which may also designate the screw threads on the head 3, which of course, fit onto screw threads on the top of the cylinder 1.

The central pipe 7 is supported in the cylinder 1 by bearings 8, which act as journals and the pipe 7 revolves in them. This pipe, at its lower end is generally provided with a mouth 9. This pipe 7 carries a number of paddles or blades 10, by means of which the pipe 7 is revolved by the force of the incoming stream of water.

Figure 7:
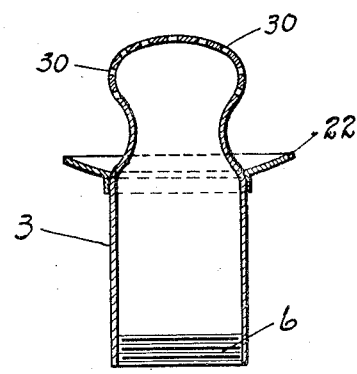
Fig. 7, is a section on line 7—7 of Fig. 8.

The sleeve 4 carries a cross-piece 12 which is made integral therewith or rigidly connected thereto, and this cross-piece is also directly connected to the pipe 7, at the point 13, so that when said pipe revolves, it will revolve the sleeve 4 and the head 3 being attached to said sleeve, said head will also revolve. The pipe 7 continues to the top of the head 3 and its extended part is marked 15, and its screw threads 14 screw onto the screw-threaded end of the said pipe 7 at the point 13¹, when said head is screwed onto the sleeve 4. When a head is used as shown in Fig. 7, the pipe end 15 just described is omitted.

At the points where the supports 8 are present in the cylinder 1, I place small valves or screws 16 through which oil can be sent to the bearing points so that the pipe 7 will run smoothly.

At the point, at top of cylinder 1, where the parts 4 and 5 are present, I provide oil holes 17, so that the revolving sleeve may be oiled at any time. In the pipe 7, within its continuation 15, I place a valve 18 operated by the wheel 19. Through this valve, the flow of water can be turned off through continuation 15 of pipe 7 and prevented from reaching the sponge 20 or equivalent cleaning element. In the head 1, when the continuation pipe part 15 is used, it is provided with a number of branch pipes as 21 at its end.

At or near the top of the head 3, I may place a fender as 22 to prevent the backward throw of the water.

Outside of the cylinder 1, at any point, I provide a soap reservoir 23, controlled by a valve 24, by means of which I may allow soap or any other cleansing element to pass into the tube 1 and commingle with the water.

A sponge or other cleaning element as 20, is connected to the extreme end 25 of head 3; in the present instance held on by a rubber band 26.

At the outlet point 27 in cylinder 1, I place a valve 28, through which the surplus water coming through the cylinder 1, can be run off to any point.

Figure 8:
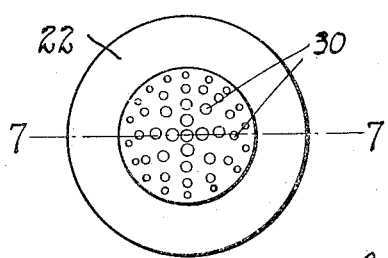
Fig. 8 is a top view of parts shown in Fig. 7.

In the head shown in Figs. 7 and 8, I place a multiplicity of perforations 30 for the emission of the water, instead of using the pipes 21.

In using the cleaning device, the water is turned on by manipulating the valve 2; the water passes with force up into and through the cylinder 1, also passing up into and through the pipe 7; the force of the water striking the blades 10, revolves the pipe 7 and thus the parts 4 and 5 are turned and consequently the head 3 is revolved. The water passes through the pipe 7 and then through the pipes 21 into the sponge 20 or into and through any other article or material which is used as the cleaner; this construction is used when it is desired to use a minimum amount of water; when a head as shown in Figs. 9 and 10 is used, a maximum amount of water can be used; and in this case, or for any other reason the water is turned off by operating the valve 18; the flow can be left on however if desired.

In Fig. 5, the head end is not rounded as shown in Fig. 7, but is flat, as shown at 31 and a flat sponge or piece of felt can be stuck onto the disk head 31 by means of glue or other adhesive material 32.

Figure 9:
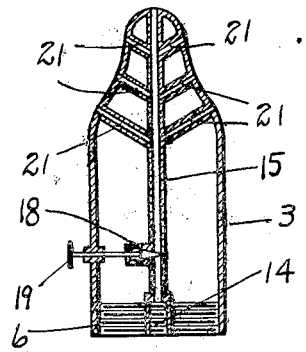
Fig. 9, is a section on line 9—9 of Fig. 10.
Figure 10:
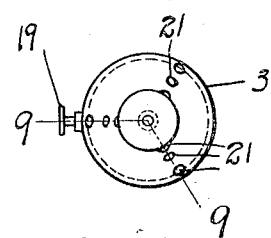
Fig. 10, is a top view of parts shown in Fig. 9.

In Fig. 9 a small head 1 is shown; this is used when the points to be cleaned are hard to reach or are small and inconvenient of access.

It will readily become apparent that by the use of different heads, the automobile can be flushed with water, or a small amount can be used, a dry or wet wash can be employed; the automobile can be sponged, rubbed or polished; the head always kept in a revolving motion; or the water can be completely turned off for certain uses.

It will be understood that any surplus water or water not needed for any of the operations, after it has reached point 27, will flow off. By using my device the work of cleaning an automobile is made convenient, quick and thorough.

While I have described one form of construction for carrying my invention into effect, it will readily become apparent that the same is capable of some modification without departing from the principle and spirit of the invention.

What I claim as new and my invention and desire to secure by Letters Patent is:

1. A cleaning device including a hollow cylinder having closed ends and provided at one end with means for controlling the admission of fluid to the cylinder and at its opposite end with means for controlling the emission of fluid from the cylinder, a pipe rotatably mounted in said cylinder and provided with propeller blades to permit fluid passing through the cylinder to rotate said pipe, one end of said pipe being open and arranged within the cylinder to permit fluid from the cylinder to pass into the pipe, a hollow rotatable head mounted at the outer end of said cylinder, arranged exteriorly of the cylinder and provided with apertures to permit fluid to be discharged from said head, and means for controlling the emission of fluid from said pipe.

2. A cleaning device as claimed in claim 1 in which the cylinder is provided with spiders supporting said rotatable pipe, said spiders being provided with passageways to permit lubrication of the pipe.

3. A cleaning device as claimed in claim 1 in which said head is provided with an internal pipe forming an extension of the pipe within the cylinder, said extension being detachably connected to the cylinder pipe and being provided with a valve which forms the means for controlling the discharge of fluid from said cylinder pipe.

4. A cleaning device including a hollow cylinder provided with spaced internal spiders, a valve for controlling the admission of fluid to one end of said cylinder, a valve controlled outlet for controlling the emission of fluid from the other end of the cylinder, an open-ended pipe arranged in the cylinder and rotatably mounted in said spiders, propeller blades fixed to said pipe to permit fluid passing through the cylinder to revolve said pipe, a sleeve rigidly connected to said pipe, a packing arranged between said sleeve and cylinder, a hollow head detachably connected to said sleeve, and means permitting the discharge of fluid from said hollow head.

In testimony whereof, I affix my signature at Cincinnati, Ohio, this 6th day of October, 1921.

JOHN W. CARRINGTON.